(12) United States Patent
Gladysz et al.

(10) Patent No.: US 11,008,354 B2
(45) Date of Patent: May 18, 2021

(54) CHIRAL SOLVATING AGENTS

(71) Applicant: The Texas A&M University System, College Station, TX (US)

(72) Inventors: John A. Gladysz, College Station, TX (US); Kyle G. Lewis, Bryan, TX (US); Quang H. Luu, College Station, TX (US)

(73) Assignee: The Texas A&M University System, College Station, TX (US)

( * ) Notice: Subject to any disclaimer, the term of this patent is extended or adjusted under 35 U.S.C. 154(b) by 74 days.

(21) Appl. No.: 16/422,831

(22) Filed: May 24, 2019

(65) Prior Publication Data

US 2019/0359641 A1   Nov. 28, 2019

Related U.S. Application Data

(60) Provisional application No. 62/676,171, filed on May 24, 2018.

(51) Int. Cl.
*C07F 15/06* (2006.01)
*G01N 24/08* (2006.01)

(52) U.S. Cl.
CPC ......... *C07F 15/065* (2013.01); *G01N 24/087* (2013.01)

(58) Field of Classification Search
None
See application file for complete search history.

(56) References Cited

U.S. PATENT DOCUMENTS 7,074,387 B2 * 7/2006 Gries ............... C07C 237/12
424/9.365

OTHER PUBLICATIONS

Gladysz et al, Chem. Sci., 41 (2018), 5087-5099.*
Diven et al. Inorganic Chemistry, vol. 42, No. 8, 2003, 2774-2782.*

* cited by examiner

*Primary Examiner* — Clinton A Brooks
(74) *Attorney, Agent, or Firm* — Winstead PC

(57) ABSTRACT

In an embodiment, a composition including a chiral solvating agent to resolve nuclear magnetic resonance signals of an enantiomer of at least one analyte, where the chiral solvating agent facilitates in the at least one analyte binding to a $C_2$ face or a $C_3$ face of the chiral solvating agent, and where the chiral solvating agent causes an upfield shift or a downfield shift in at least one nuclear magnetic resonance signals corresponding to a $^1H$, $^{19}F\{^1H\}$, or $^{31}P\{^1H\}$ signal, and where the chiral solvating agent includes a cobalt cation. In another embodiment, a method that includes mixing a chiral solvating agent, including a cobalt cation, with at least one analyte to form a solution, obtaining nuclear magnetic resonance spectra of the solution, and identifying an enantiomer of the at least one analyte. In some embodiments, the method further includes determining enantiomeric purities of the at least one analyte.

12 Claims, 8 Drawing Sheets

| Analyte / NMR signals[a] | $\Delta\delta$[b] mol% | $\Delta\delta$[c] mol% | Analyte / NMR signals[a] | $\Delta\delta$[b] mol% | $\Delta\delta$[c] mol% |
|---|---|---|---|---|---|
| 18 | 0.11 / 1.0 | 0.09 / 1.0 | 19 | 0.09[e] / 11 | 0.07[e] / 10 |
| 20 | 0.09[e] / 3.0 | 0.10[e] / 2.0 | 21 | 0.09 / 5.0 | 0.09 / 12 |
| 22 | 0.06 / 5.0 | 0.06 / 4.0 | 23 | 0.11 / 7.0 | 0.16 / 50 |
| 24 | 0.07 / 33 | —[f] | 25 | 0.08 / 6.0 | 0.05 / 33 |
| 26 | 0.05 / 2.0 | 0.06 / 3.0 | 27 | 0.03 / 3.0 | —[f] |
| 28 | 0.02 / 22 | —[f] | 29 | 0.10 / 11 | 0.07 / 25 |
| 30 | 0.04 / 2.0 | 0.04 / 2.0 | 31 | 0.12 / 18 | 0.06 / 18 |

CHIRAL SOLVATING AGENTS

CROSS-REFERENCE TO RELATED APPLICATIONS

This patent application claims priority from, and incorporates by reference the entire disclosure of, U.S. Provisional Patent Application No. 62/676,171 filed on May 24, 2018.

TECHNICAL FIELD

The present disclosure relates generally to agents and more particularly, but not by way of limitation, to compositions and methods for chiral solvating agents.

BACKGROUND

This section provides background information to facilitate a better understanding of the various aspects of the disclosure. It should be understood that the statements in this section of this document are to be read in this light, and not as admissions of prior art.

Ever since the recognition of molecular chirality, chemists have sought to quantify enantiomer ratios in non-racemic samples. For more than a century, the dominant method was polarimetry, despite many intrinsic limitations. Today, nearly every analytical technique is being brought to bear on the problem, often in a quest for high throughput screening. Two broad classes of assays see the most use, "chiral" chromatography and Nuclear magnetic resonance (NMR) spectroscopy.

NMR methods can be divided into three principal categories: chiral derivatizing agents (CDAs), paramagnetic chiral lanthanide shift reagents (CLSRs), and chiral solvating agents (CSAs). Over the past few years, the last approach has attracted increasing attention. Many, but not all, of the CSAs are hydrogen bond donors, often with two-four NH or OH groups. Some of these have been tailored to recognize a specific functional group, while others have wider applicability.

SUMMARY OF THE INVENTION

This summary is provided to introduce a selection of concepts that are further described below in the Detailed Description. This summary is not intended to identify key or essential features of the claimed subject matter, nor is it to be used as an aid in limiting the scope of the claimed subject matter.

In an embodiment, the present disclosure pertains to a composition including a chiral solvating agent to resolve nuclear magnetic resonance signals of an enantiomer of at least one analyte, where the chiral solvating agent facilitates in the at least one analyte binding to a $C_2$ face or a $C_3$ face of the chiral solvating agent, and where the chiral solvating agent causes an upfield shift or a downfield shift in at least one nuclear magnetic resonance signal corresponding to a $^1H$, $^{19}F\{^1H\}$, or $^{31}P\{^1H\}$ signal, and where the chiral solvating agent includes a cobalt cation.

In another embodiment, the present disclosure pertains to a method that includes mixing a chiral solvating agent, including a cobalt cation, with at least one analyte to form a solution, obtaining nuclear magnetic resonance spectra of the solution, and identifying an enantiomer of the at least one analyte. In some embodiments, the method further includes determining enantiomeric purities of the at least one analyte.

In some embodiments, the cobalt cation can be [Co((S,S)—NH$_2$CHPhCHPhNH$_2$)$_3$]$^{3+}$, [Co((R,R)—NH$_2$CHPhCHPhNH$_2$)$_3$]$^{3+}$, [Co((S,S)—NH$_2$CHArCHArNH$_2$)$_3$]$^{3+}$, [Co((R,R)—NH$_2$CHArCHArNH$_2$)$_3$]$^{3+}$, or combinations thereof. In some embodiments, the Ar is an aryl group that can be a phenyl group, a naphthyl group, a furanyl group, similar heterocyclic groups, substituted derivatives thereof, or combinations thereof.

In some embodiments, the cobalt cation can be [Co(en)$_2$(NH$_2$—CH$_2$CH((CH$_2$)$_n$N(CH$_3$)$_2$)NH$_2$)]$^{3+}$, [Co(en)$_2$(NH$_2$CH$_2$CH((CH$_2$)$_n$N(R)(R'))NH$_2$)]$^{3+}$, or combinations thereof. In some embodiments, R and R' can each be H, Ph, Bn, an alkyl group, an aryl group, Si(R$^1$)$_2$(R$^2$), C(R$^1$)$_2$(R$^2$) or combinations thereof. In some embodiments, R$^1$ and R$^2$ can each be H, Ph, Bn, an alkyl group, an aryl group, or combinations thereof.

In some embodiments, the cobalt cation is in the form of a salt including at least one lipophilic anion, lipophilic dianion, or lipophilic trianion. In some embodiments, the chiral solvating agent has a loading between less than 1 mol % to 100 mol %. In some embodiments, the at least one analyte comprises a plurality of enantiomeric compounds.

BRIEF DESCRIPTION OF THE DRAWINGS

A more complete understanding of the method and apparatus of the present disclosure may be obtained by reference to the following Detailed Description when taken in conjunction with the accompanying Drawings and Tables wherein.

DETAILED DESCRIPTION

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

Figure 1:
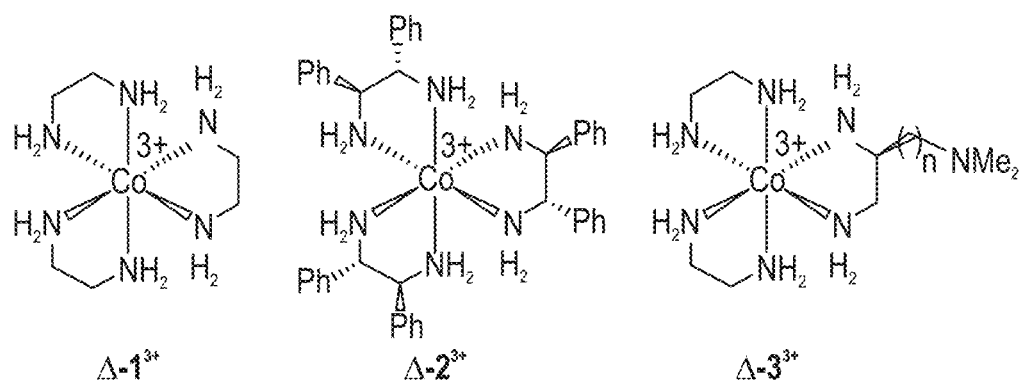
FIG. 1 illustrates chiral hydrogen bond donor catalysts based upon cobalt(III) tris(ethylenediamine) cations.

The first chiral inorganic compounds to be isolated in enantiomerically pure form included salts of the cation [Co(en)$_3$]$^{3+}$ (1$^{3+}$; en=ethylenediamine). The present disclosure seeks to demonstrate that lipophilic salts of this cation and the related species [Co((S,S)—NH$_2$CHArCHArNH$_2$)$_3$]$^{3+}$ (2$^{3+}$ for Ar=Ph) and [Co(en)$_2$(NH$_2$—CH$_2$CH((CH$_2$)$_n$N(CH$_3$)$_2$)NH$_2$)]$^{3+}$ (3$^{3+}$) all of which are depicted in FIG. 1, serve as hydrogen bond donors to a variety of Lewis basic molecules, enabling catalysis for a variety of organic transformations. The cation 1$^{3+}$ features only metal centered chirality, for which the absolute configurations are traditionally designated Λ and Δ. In the cations 2$^{3+}$ and 3$^{3+}$, the three ethylenediamine ligands are substituted with six aryl groups or a single (CH$_2$)$_n$N(CH$_3$)$_2$ moiety, respectively. The latter constitutes a bifunctional catalyst. Both enantiomers of the NH$_2$CHPhCHPhNH$_2$ (dpen) ligand in 2$^{3+}$ are commercially available at modest prices.

Although the mechanisms of these transformations are still under investigation, effectiveness is thought to be rooted in the large number of NH groups (twelve). In certain embodiments, as many as five to six might play a role in transition state assemblies, as opposed to a maximum of two with most current catalysts, such as thioureas. As such, these compositions possess unique capabilities as CSAs. Indeed, in the course of screening catalytic reactions by nuclear magnetic resonance (NMR), marked differentiation of enantiomers and enantiotopic (prochiral) groups were noted.

When NMR spectra of chiral racemic organic molecules containing a Lewis basic functional group are recorded in the presence of air and water stable salts of the cobalt(III) cation [Co((S,S)—NH$_2$CHPhCHPhNH$_2$)$_3$]$^{3+}$ (2$^{3+}$), separate signals are usually observed for the enantiomers (28 diverse examples, >12 functional groups). Several chiral molecules can be simultaneously analyzed, and enantiotopic groups in prochiral molecules differentiated (16 examples). Particularly effective are the mixed bis(halide)/tetraarylborate salts Λ-2$^{3+}$ 2X$^-$BAr$_f^-$ (X=Cl, I; BAr$_f$=B(3, 5-C$_6$H$_3$(CF$_3$)$_2$)$_4$), which are applied in CD$_2$Cl$_2$ or CDCl$_3$ at 1-100 mol % (avg 34 and 14 mol %). Without being bound by theory, the NH moieties of the C$_2$ faces of the cation are believed to hydrogen bond to the Lewis basic functional groups, as seen in the crystal structure of a hexakis(DMSO) solvate of Λ-2$^{3+}$ 3I$^-$. These salts are the most broadly applicable chirality-sensing agents currently known.

The present disclosure demonstrates a detailed study of chirality and prochirality sensing by the preceding complexes, and in particular the commercially available bis (chloride)/tetraarylborate mixed salt Λ-2$^{3+}$ 2Cl$^-$BAr$_f^-$ (BAr$_f$=B(3,5-C$_6$H$_3$(CF$_3$)$_2$)$_4$) and the bis(iodide) analog Λ-2$^{3+}$ 2I$^-$BAr$_f^-$. These robust, air and water stable, substances are remarkable in affording baseline NMR signal separations at loadings as low as 1 mol %. The scope of functional group applicability ranks with the most versatile existing CSAs, and they appear unsurpassed in differentiating enantiotopic groups in achiral molecules.

The present disclosure seeks to establish that salts of cobalt(III) cation can be among the best chiral solvating agents currently known in terms of applicability to a broad spectrum of analytes, their use at low loadings (avg 34 and 14 mol %, 2X$^-$BAr$_f^-$ salts (X=Cl, I; BAr$_f$=B(3,5-C$_6$H$_3$(CF$_3$)$_2$)$_4$)), and their ability to analyze mixtures. Without being bound by theory, it is thought that hydrogen bonding from the NH groups to the analytes can play a vital role.

Working Examples

The CSAs Λ-2$^{3+}$ 2Cl$^-$BAr$_f^-$, Λ-2$^{3+}$ 2Cl$^-$B(C$_6$F$_5$)$_4^-$, Λ-2$^{3+}$ 3BAr$_f^-$, and Δ-2$^{3+}$ 2Cl$^-$BAr$_f^-$ were synthesized according to known procedures, and Λ-1$^{3+}$ 3BAr$_f^-$ was prepared as described for the enantiomer according to known procedures; Λ-2$^{3+}$ 2Cl$^-$BAr$_f^-$ is also commercially available. All abbreviations are defined as set forth above. All reactions and workups were conducted in air.

Λ-2$^{3+}$ 3I$^-$

A round bottom flask was charged with a suspension of Λ-2$^{3+}$ 3Cl$^-$.3H$_2$O (0.170 g, 0.199 mmol) in acetone (20 mL) and KI (0.099 g, 0.597 mmol) was added with vigorous stirring. A suspension of white particles in an orange solution formed. After 1 h, the mixture was filtered. The solvent was removed from the filtrate by rotary evaporation and oil pump vacuum (20 h, rt) to give Λ-2$^{3+}$ 3I$^-$.3H$_2$O (0.219 g, 0.194 mmol, 97%) as an orange solid, mp 200-202° C. dec (open capillary). Anal. Calcd. for C$_{42}$H$_{48}$CoI$_3$N$_6$.3H$_2$O (1130.07): C, 44.62, H, 4.81, N, 7.43; found C, 44.81, H, 4.91, N, 7.02.

NMR (CD$_3$OD/acetone-d$_6$, δ in ppm): $^1$H (500 MHz) 7.51-7.49 (m, 12H, o-Ph), 7.38-7.37 (m, 18H, m-, p-Ph), 6.75 (br s, 6H, NHH'), 5.95 (br s, 6H, NHH'), 5.26 (s, 6H, CHPh), 2.83 (br s, 7H, H$_2$O); $^{13}$C{$^1$H} (125 MHz) 136.4 (s, i-Ph), 130.1 (s, p-Ph), 129.9 and 129.7 (2 s, o- and m-Ph), 62.8 (s, CHPh). IR (powder film, cm$^{-1}$): 3032 (m, v$_{NH}$), 1683 (m, δ$_{NH}$), 1041 (vs, δ$_{CCN}$)

Λ-2$^{3+}$ 2I$^-$BAr$_f^-$ (A) A round bottom flask was charged with Λ-2$^{3+}$ 3I$^-$.3H$_2$O (0.117 g, 0.104 mmol), CH$_2$Cl$_2$ (20 mL), H$_2$O (20 mL), and Na$^+$ BAr$_f^-$ (0.092 g, 0.104 mmol). The mixture was vigorously stirred until the orange color had entirely transferred to the CH$_2$Cl$_2$ layer (30 min), which was separated. The solvent was removed by passive evaporation (fume hood) and oil pump vacuum (20 h, rt) to give Λ-2$^{3+}$ 2I$^-$BAr$_f^-$.0.5H$_2$O (0.188 g, 0.103 mmol, 99%) as a red solid, mp 107-110° C. dec (black liquid, open capillary). Anal. Calcd. for C$_{74}$H$_{60}$BCoF$_{24}$I$_2$N$_6$.0.5H$_2$O (1821.20): C, 48.79, H, 3.37, N, 4.61; found C, 48.88, H, 3.61, N, 4.62. (B) A round bottom flask was charged with aqueous NaI (15.0 mL, 10 wt %, 10.5 mmol), toluene (15.0 mL), and Λ-2$^{3+}$ 2Cl$^-$BAr$_f^-$.2H$_2$O (0.259 g, 0.152 mmol). The mixture was vigorously stirred, and after 6 h transferred to a separatory funnel. The clear aqueous layer was discarded and the red toluene layer was washed with water (2×10 mL). The solvent was removed from the toluene layer by rotary evaporation. The residue was dissolved in $CH_3OH$ (10 mL) and the solution was stirred for 20 min. The solvent was removed again by rotary evaporation and oil pump vacuum (10 h, rt) to give $\Lambda$-$2^{3+}$ 2I⁻BAr$_f^-$.0.5 $H_2O$ (0.277 g, 0.152 mmol, >99%) as a red solid, mp 108-110° C. dec (black liquid, open capillary). Anal. Calcd., see above; found C, 49.17, H, 3.50, N, 4.46.

Data for $\Lambda$-$2^{3+}$ 2I⁻BAr$_f^-$.0.5$H_2O$: NMR ($\delta$ in ppm): $^1H$ (500 MHz, $CDCl_3$ or $CD_2Cl_2$) BAr$_f^-$ at 7.69 or 7.71 (s, 8H, o), 7.49 or 7.55 (s, 4H, p); (S,S)-dpen at 7.37-7.27 or 7.29-7.44 (m, 30H, ArH), 6.98 or 7.88 (br s, 6H, NHH'), 4.86 or 4.21 (br s, 6H, NHH'), 4.60 (s, 6H, CHPh); 2.22 or 1.78 (br s, 5H or 2H, $H_2O$). $^{13}C\{^1H\}$ (126 MHz, $CD_2Cl_2$) BAr$_f^-$ at 162.3 (q, $^1J_{BC}$=49.8 Hz, i), 135.4 (s, o), 129.4 (q, $^2J_{CF}$=31.5 Hz, m), 125.2 (q, $^1J_{CF}$=272.3 Hz, $CF_3$), 118.1 (s, p); (S,S)-dpen ligand at 134.6 (s, i-Ph), 130.8 (s, p-Ph), 130.3 (s, o-Ph), 128.7 (s, m-Ph), 62.7 (s, CHPh). IR (powder film, cm⁻¹): 3064 (m, $v_{NH}$), 1608 (m, $\delta_{NH}$), 1354 (s, $v_{Ar-CF3}$), 1275 (vs, $v_{CF}$), 1117 (vs, $\delta_{CCN}$).

A 5 mm NMR tube was charged with a 0.0071 M solution of a CSA (0.70 mL, 0.0049 mmol) in the indicated solvent. Neat 1-phenylethyl acetate (4; 0.00050 mL, 0.0012 g, 0.0050 mmol) was added and a $^1H$ NMR spectrum was recorded. Table 1, shown below, illustrates separation of the methine proton $^1H$ NMR signals ($\Delta\delta$, ppm) of the enantiomers of racemic 1-phenylethyl acetate (4) as a function of CSA (1.0 equiv) and solvent. Solvent samples were prepared in 5 mm NMR tubes as described herein.

TABLE 1

| Entry | CSA | Solvent | $\Delta\delta$ |
|---|---|---|---|
| 1 | $\Lambda$-$1^{3+}$ 3BAr$_f^-$ | $CD_2Cl_2$ | —a |
| 2 | $\Lambda$-$2^{3+}$ 2Cl⁻BAr$_f^-$ | $CD_2Cl_2$ | 1.32 |
| 3 | $\Lambda$-$2^{3+}$ 2Cl⁻BAr$_f^-$ | $CD_2Cl_2$ | 0.15 |
| 4 | $\Lambda$-$2^{3+}$ 2Cl⁻B($C_6F_5$)$_4^-$ | $CD_2Cl_2$ | 1.37 |
| 5 | $\Lambda$-$2^{3+}$ 3BAr$_f^-$ | $CD_2Cl_2$ | 0.34 |
| 6 | $\Lambda$-$2^{3+}$ 2I⁻BArf⁻ | $CD_2Cl_2$ | 1.30 |
| 7 | $\Lambda$-$2^{3+}$ 2I⁻BArf⁻ | $CDCl_3$ | 1.75 |
| 8 | $\Lambda$-$2^{3+}$ 2I⁻BArf⁻ | acetone-$d_6$ | —a |
| 9 | $\Lambda$-$2^{3+}$ 2I⁻BArf⁻ | $CD_3CN$ | —a |
| 10 | $\Lambda$-$2^{3+}$ 2I⁻BArf⁻ | DMSO-$d_6$ | —a |
| 11 | $\Lambda$-$2^{3+}$ 2Cl⁻BAr$_f^-$ | acetone-$d_6$ | —a |
| 12 | $\Lambda$-$2^{3+}$ 2Cl⁻BAr$_f^-$ | $CD_3CN$ | —a |
| 13 | $\Lambda$-$2^{3+}$ 2Cl⁻BAr$_f^-$ | DMSO-$d_6$ | —a | aSeparate signals for the enantiomers were not observed, although line widths increased from 0.6-0.9 to 1.0-2.0 Hz.

Figure 2:
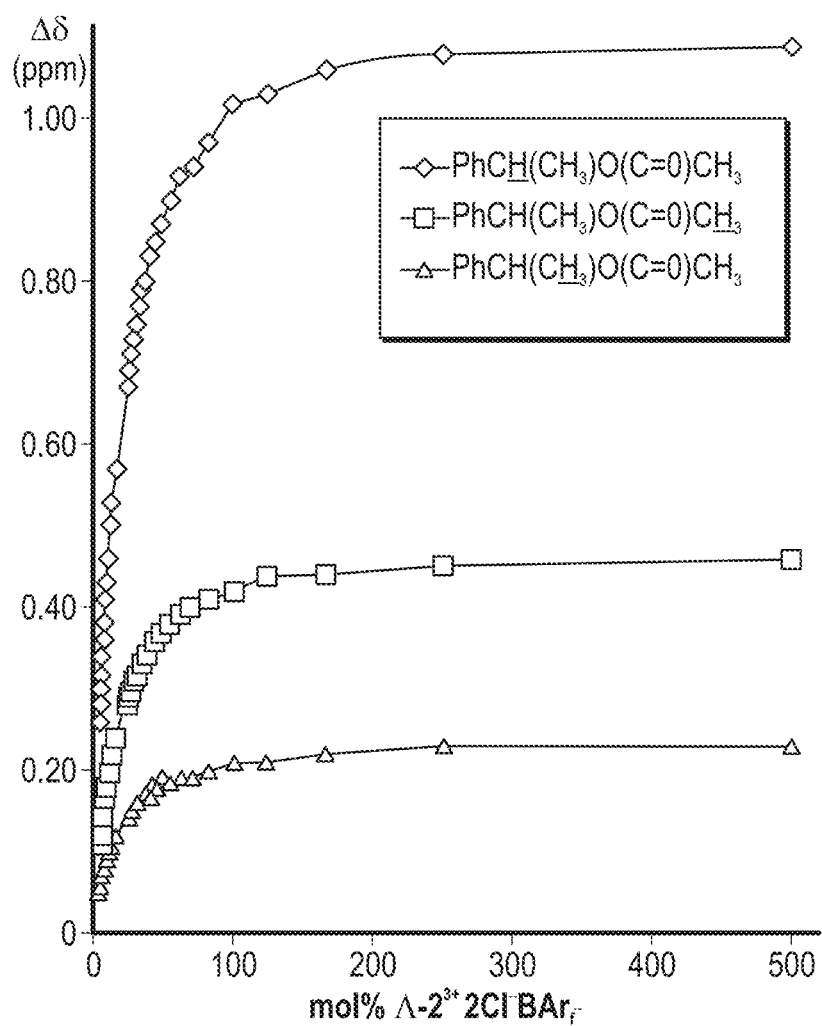
FIG. 2 illustrates dependence of the separation of the aliphatic $^1H$ NMR signals of the enantiomers of 4 (Δδ, CD$_2$Cl$_2$) upon the mol % of the CSA Λ-2$^{3+}$ 2Cl⁻BAr$_f^-$.

A 5 mm NMR tube was charged with a $CD_2Cl_2$ solution of $\Lambda$-$2^{3+}$ 2Cl⁻ BAr$_f^-$.2$H_2O$ (0.70 mL, 0.036 M, 0.025 mmol). Neat 4 was then added in 0.00050 mL increments (ca. 0.0012 g, 0.0050 mmol). A $^1H$ NMR spectrum was acquired after each addition. The total volume of 4 added from the first data point (500 mol %) to the final data point (5 mol %) was 0.050 mL. FIG. 2 illustrates dependence of the separation of the aliphatic $^1H$ NMR signals of the enantiomers of 4 ($\Delta\delta$, $CD_2Cl_2$) upon the mol % of the CSA $\Lambda$-$2^{3+}$ 2Cl⁻BAr$_f^-$.

Figure 3:
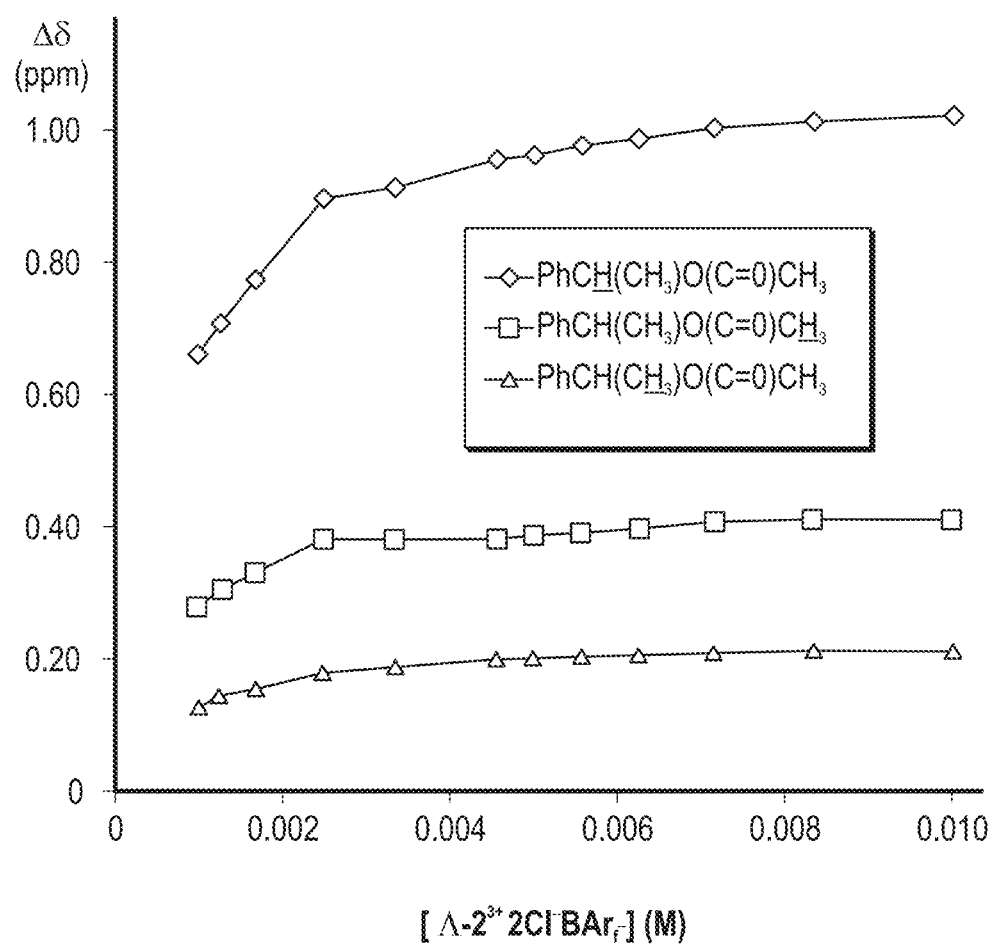
FIG. 3 illustrates dependence of the separation of the aliphatic $^1H$ NMR signals of the enantiomers of 4 (Δδ, CD$_2$Cl$_2$) upon concentration using the CSA Λ-2$^{3+}$ 2Cl⁻BAr$_f^-$ (constant at 25 mol %).

A 5 mm NMR tube was charged with a $CD_2Cl_2$ solution (0.50 mL) that was 0.040 M in 4 (0.020 mmol) and 0.010 M in $\Lambda$-$2^{3+}$ 2Cl⁻BAr$_f^-$.2$H_2O$ (0.0050 mmol, 25 mol %). A $^1H$ NMR spectrum was recorded. Then $CD_2Cl_2$ was added in increments so as to attain total volumes of 0.60, 0.70, 0.80, 0.90, 1.00, 1.10, 1.50, 2.00, 3.00, 4.00, and 5.00 mL. After each addition, a $^1H$ NMR spectrum was recorded. FIG. 3 illustrates dependence of the separation of the aliphatic $^1H$ NMR signals of the enantiomers of 4 ($\Delta\delta$, $CD_2Cl_2$) upon concentration using the CSA $\Lambda$-$2^{3+}$ 2Cl⁻BAr$_f^-$ (constant at 25 mol %).

Figure 4:
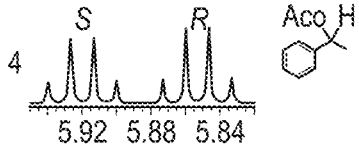
FIG. 4 illustrates separation of NMR signals of the enantiomers of various analytes in the presence of the CSAs Λ-2$^{3+}$ 2I⁻BAr$_f^-$ (CDCl$_3$) or Λ-2$^{3+}$ 2Cl⁻BAr$_f^-$ (CD$_2$Cl$_2$). Samples were prepared in 5 mm NMR tubes as described herein. $^a$ denotes the spectra depicted ($^1H$ unless noted) were obtained with Λ-2$^{3+}$ 2I⁻BAr$_f^-$ in CDCl$_3$. $^b$ denotes signal separation (ppm)/mol % using Λ-2$^{3+}$ 2I⁻BAr$_f^-$. $^c$ denotes signal separation (ppm)/mol % using Λ-2$^{3+}$ 2Cl⁻ BAr$_f^-$. $^d$ denotes $^{19}F\{^1H\}$ NMR spectra were utilized. $^e$ denotes $^{31}P\{^1H\}$ NMR spectra were utilized. $^f$ denotes separate signals for the enantiomers were not observed.

Chirality Sensing (A) (liquid analytes 4-7, 10, 14-18, 21-25, 27-29, 31). 5 mm NMR tubes were charged with $CD_2Cl_2$ solutions of $\Lambda$-$2^{3+}$ 2Cl⁻BAr$_f^-$.2$H_2O$ or $CDCl_3$ solutions of $\Lambda$-$2^{3+}$ 2I⁻BAr$_f^-$.0.5$H_2O$ (0.70 mL, 0.0071 M, 0.0049 mmol). The samples were titrated with neat liquid analytes in increments of 0.0050 mmol (1.0 equiv) and monitored by $^1H$ NMR. Experiments were halted when separate signals for the enantiomers were no longer observed. The total volume of liquids added usually ranged from 0.72 to 0.80 mL. (B) (solid analytes 8, 9, 11-13, 19-20, 26, 30). Procedure (A) was repeated, but with the analytes added as 10.0 M $CD_2Cl_2$ or $CDCl_3$ solutions in increments of 0.00050 mL (0.0050 mmol). FIG. 4 illustrates separation of NMR signals of the enantiomers of various analytes in the presence of the CSAs $\Lambda$-$2^{3+}$ 2I⁻BAr$_f^-$ ($CDCl_3$) or $\Lambda$-$2^{3+}$ 2Cl⁻BAr$_f^-$ ($CD_2Cl_2$). Samples were prepared in 5 mm NMR tubes as described herein. [a] denotes the spectra depicted ($^1H$ unless noted) were obtained with $\Lambda$-$2^{3+}$ 2I⁻BAr$_f^-$ in $CDCl_3$. [b] denotes signal separation (ppm)/mol % using $\Lambda$-$2^{3+}$ 2I⁻BAr$_f^-$. [c] denotes signal separation (ppm)/mol % using $\Lambda$-$2^{3+}$ 2Cl⁻BAr$_f^-$. [d] denotes $^{19}F\{^1H\}$ NMR spectra were utilized. [e] denotes $^{31}P\{^1H\}$ NMR spectra were utilized. [f] denotes separate signals for the enantiomers were not observed.

Enhanced Throughput Sensing

Figure 5A:
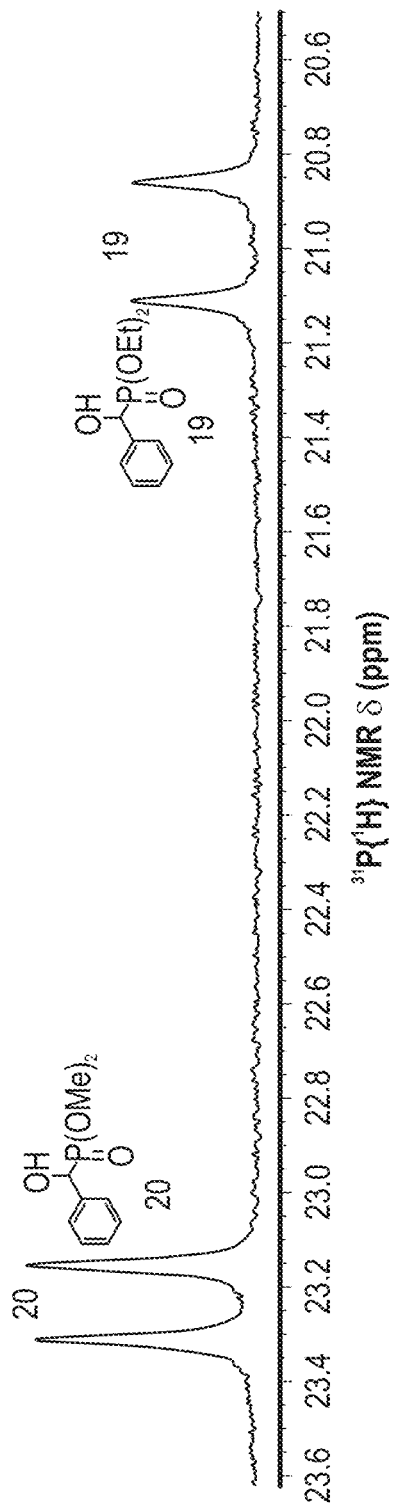
FIG. 5A illustrates $^{31}P\{^1H\}$ NMR spectra and FIG. 5B illustrates $^1H$ NMR spectra of a CDCl$_3$ solution of a 2.0:2.0:2.0:1.0:2.0:1.0 mixture of 4, 7, 10, 19, 20 and the CSA Λ-2$^{3+}$ 2I⁻BAr$_f^-$ (50 mol % vs. 4, 7, 10, and 20; 100 mol % vs. 19), the enantiomers of all five analytes exhibit separate signals.
Figure 5B:
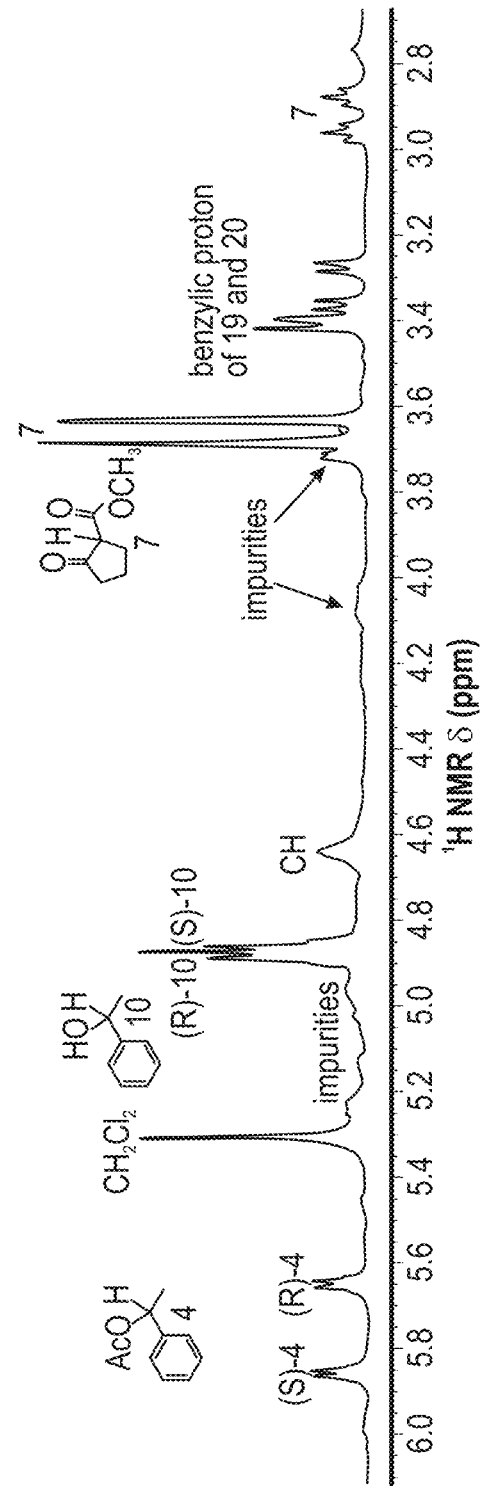

A 5 mm NMR tube was charged with a $CDCl_3$ solution (0.70 mL) that was 0.029 M in 4, 7, 10, and 20 (0.020 mmol each), and 0.014 M in 19 (0.010 mmol). Then $\Lambda$-$2^{3+}$ 2I⁻BAr$_f^-$.0.5$H_2O$ (0.018 g, 0.010 mmol) was added, and $^1H$ and $^{31}P\{^1H\}$ NMR spectra were recorded. FIG. 5A illustrates $^{31}P\{^1H\}$ NMR spectra and FIG. 5B illustrates $^1H$ NMR spectra of a $CDCl_3$ solution of a 2.0:2.0:2.0:1.0:2.0:1.0 mixture of 4, 7, 10, 19, 20 and the CSA $\Lambda$-$2^{3+}$ 2I⁻BAr$_f^-$ (50 mol % vs. 4, 7, 10, and 20; 100 mol % vs. 19), the enantiomers of all five analytes exhibit separate signals.

Prochirality Sensing

Figure 6:
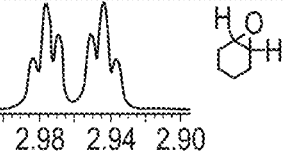
FIG. 6 illustrates separation of $^1H$ NMR signals of enantiotopic groups of various achiral analytes in the presence of 100 mol % (1.0 equiv) of the CSAs Λ-2$^{3+}$ 2I⁻BAr$_f^-$ (CDCl$_3$) or Λ-2$^{3+}$ 2Cl⁻BAr$_f^-$ (CD$_2$Cl$_2$). Samples were prepared in 5 mm NMR tubes as described herein. $^a$ denotes the spectra depicted were obtained with Λ-2$^{3+}$ 2I⁻BAr$_f^-$ in CDCl$_3$. $^b$ denotes signal separation (ppm) using Δ-2$^{3+}$ 2I⁻BAr$_f^-$. $^c$ denotes signal separation (ppm) using Λ-2$^{3+}$ 2Cl$^-$BAr$_f^-$. $^d$ denotes separate signals for the enantiomers were not observed in the presence of 100-500 mol % of Λ-2$^{3+}$ 2I$^-$BAr$_f^-$.

A 5 mm NMR tube was charged with a $CD_2Cl_2$ solution of $\Lambda$-$2^{3+}$ 2Cl⁻BAr$_f^-$.2$H_2O$ or a $CDCl_3$ solution of $\Lambda$-$2^{3+}$ 2I⁻BAr$_f^-$.0.5$H_2O$ (0.70 mL, 0.0071 M, 0.0049 mmol). The analyte (1.0 equiv) was added as a neat liquid (32-38, 40-42, 44, 46) or solid (39, 43, 45, 47) and $^1H$ NMR spectra were recorded. FIG. 6 illustrates separation of $^1H$ NMR signals of enantiotopic groups of various achiral analytes in the presence of 100 mol % (1.0 equiv) of the CSAs $\Lambda$-$2^{3+}$ 2I⁻BAr$_f^-$ ($CDCl_3$) or $\Lambda$-$2^{3+}$ 2Cl⁻BAr$_f^-$ ($CD_2Cl_2$). Samples were prepared in 5 mm NMR tubes as described herein. [a] denotes the spectra depicted were obtained with $\Lambda$-$2^{3+}$ 2I⁻BAr$_f^-$ in $CDCl_3$. [b] denotes signal separation (ppm) using $\Lambda$-$2^{3+}$ 2I⁻BAr$_f^-$. [c] denotes signal separation (ppm) using $\Lambda$-$2^{3+}$ 2Cl⁻BAr$_f^-$. [d] denotes separate signals for the enantiomers were not observed in the presence of 100-500 mol % of $\Lambda$-$2^{3+}$ 2I⁻BAr$_f^-$.

Titration of a CSA with Dimethyl Malonate

Figure 7:
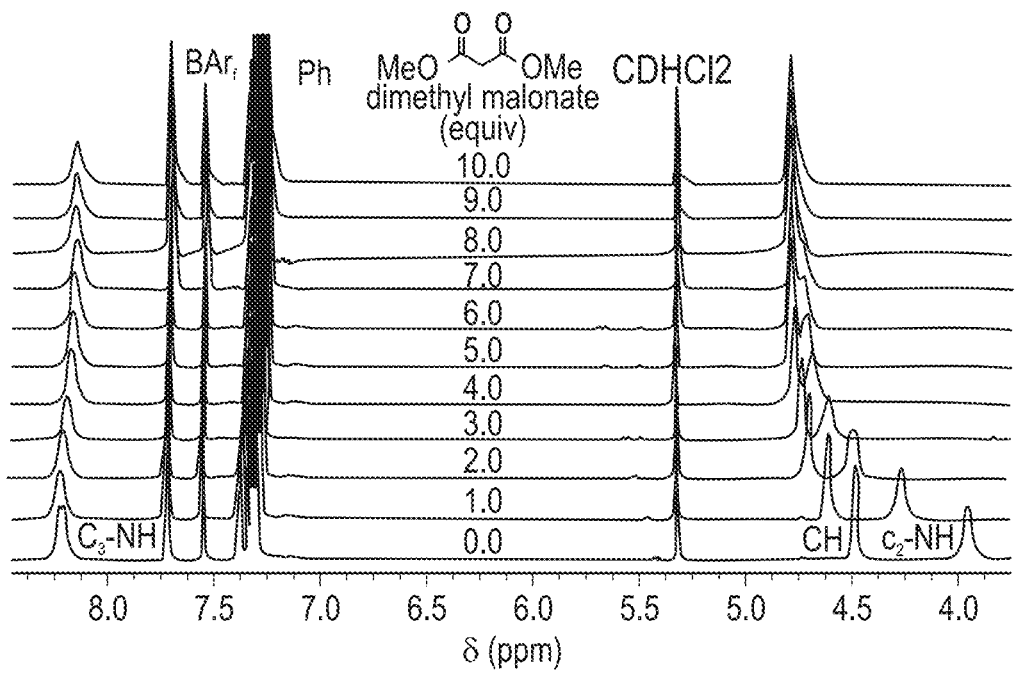
FIG. 7 illustrates $^1$H NMR spectra: titration of a 0.019 M CD$_2$Cl$_2$ solution of Λ-2$^{3+}$ 2Cl$^-$BAr$_f^-$ (0.0076 mmol; bottom spectrum) with dimethyl malonate in 0.0080 mL (0.0073 mmol) increments (ten ascending spectra).

A 5 mm NMR tube was charged with a 0.019 M $CD_2Cl_2$ solution (0.40 mL) of $\Lambda$-$2^{3+}$ 2Cl⁻BAr$_f^-$.2$H_2O$ (0.0076 mmol). A reference $^1H$ NMR spectrum was recorded. A 0.91 M $CD_2Cl_2$ solution of dimethyl malonates was added in 0.0080 mL increments (0.0073 mmol). A $^1H$ NMR spectrum was recorded after each addition. FIG. 7 illustrates $^1H$ NMR spectra: titration of a 0.019 M $CD_2Cl_2$ solution of $\Lambda$-$2^{3+}$ 2Cl⁻BAr$_f^-$ (0.0076 mmol; bottom spectrum) with dimethyl malonate in 0.0080 mL (0.0073 mmol) increments (ten ascending spectra).

NMR spectra were recorded on a Varian NMRS 500 MHz spectrometer at ambient probe temperature. Chemical shifts (δ in ppm) were referenced to residual solvent signals ($^1$H: CHCl$_3$, 7.26; CHD$_2$CN, 1.94; DMSO-d$_5$, 2.50; CHD$_2$OD, 3.30; CDHCl$_2$, 5.32; acetone-d$_5$, 2.05; $^{13}$C: CDCl$_3$, 77.2; DMSO-d$_6$, 39.5; CD$_3$OD, 49.0; CD$_2$Cl$_2$, 54.0; acetone-d$_6$, 29.8) or external C$_6$F$_6$ ($^{19}$F, −164.9) or 85 wt % aqueous H$_3$PO$_4$ ($^{31}$P, 0.00). IR spectra were recorded on a Shimadzu IRAffinity-1 spectrometer (Pike MIRacle ATR system, diamond/ZnSe crystal). Melting points were determined using an OptiMelt MPA 100 instrument. Microanalyses were conducted by Atlantic Microlab. HPLC analyses were carried out with a Shimadzu instrument package (pump/autosampler/detector LC-20AD/SIL-20A/SPD-M20A).

NMR solvents (Cambridge Isotopes) were treated as follows: DMSO-d$_6$, distilled under vacuum and stored over molecular sieves; CDCl$_3$, CD$_2$Cl$_2$, acetone-d$_6$, CD$_3$CN, and CD$_3$OD, stored over molecular sieves. HPLC grade solvents (hexanes, Fischer; isopropanol (38), JT Baker) were degassed. The following materials were used as received: CH$_2$Cl$_2$ (EMD Chemicals, ACS grade), CH$_3$OH (EMD, anhydrous, 99.8%), acetone (BDH, ACS grade), toluene (BDH, ACS grade), Co(OAc)$_2$.4H$_2$O (Alfa Aesar, 98%), (S,S)-dpen (NH$_2$CHPhCHPhNH$_2$; Oakwood or Combi blocks), activated charcoal (Acros, Norit SX 4), Nat BAr$_f^-$ (BAr$_f^-$=B(3,5-C$_6$H$_3$(CF$_3$)$_2$)$_4^-$; Ark Pharm, 97%), aqueous HI (Aldrich, 57 wt %, 99.9%), CoI$_2$ (Aldrich, anhydrous, 99%), KI (Aldrich, anhydrous, 99%), NaI (EMD, >99.5%), silica gel (Silicycle SILIAFLASH® F60), Celite 545 (Aldrich), (S)-1-phenethyl amine ((S)-5, TCI Chemicals, >98%, ee 97+%), 2-carbomethoxy cyclopentanone (7, TCI Chemicals, 97%), D- and L-proline (R- and S-9, Acros Organics, 99%), (S)-1-phenylethanol ((S)-10; Alfa Aesar, 98+%), (R)-10 (Alfa Aesar, 99%, ee 97+%), DL-lactide (11, Aldrich, 99%), L-lactide (S,S-11, Aldrich, 98%), (S)- and (R)-1,1'-bi-2-naphthol ((S)- and (R)-BINOL, Ark Pharm, >98%), 6-hexanolactone (12, Alfa Aesar, 98%), styrene oxide (16, Alfa Aesar, 98%), 1,2-propanediol (21, Aldrich, 99%), 1,2-butanediol (22, Aldrich, 98%), 2-carbomethoxy cycloheptanone (23, Aldrich, 99%), ethyl 2-methylacetoacetate (24, Alfa Aesar, 95%), 2-acetylcyclopentanone (25, TCI Chemicals, >95%), (S)-tert-butylsulfinamide ((S)-26, Ark Pharm, 98%), (R)-tert-butylsulfinamide ((R)-26, ACS Scientific, 98%), 2-methyltetrahydofuran (27, Aldrich, >99%), 2-bromopropionamide (30, Aldrich, 99%), 2-carboethoxy cyclohexanone (31, Aldrich, 95%), cyclohexene oxide (32, TCI Chemicals, 98%), methyl ethyl ketone (33, Aldrich, 99%), chloroacetone (34, Acros Organics, 96%), DMSO (35, BDH, 99.9%), ethyl acetate (36, Aldrich, 99.8%), isopropylamine (37, Alfa Aesar, 99%), 1-methyl-2-oxindole (39, Aldrich, 97%), ethyl acetoacetate (40, Alfa Aesar, 99%), 2-bromoethyl acetate (41, TCI Chemicals, >98%), 3-pentanone (42, Aldrich, >99%), 2-bromoacetophenone (43, Alfa Aesar, 98%), ethyl chloroacetate (44, TCI Chemicals, 98%), benzyl carbamate (45, Alfa Aesar, 99%), ethyl cyanoacetate (46, TCI Chemicals, >98%), propionamide (47, TCI Chemicals, >98%), dimethyl malonates (Alfa Aesar, 98%), sec-butylbenzene (TCI Chemicals, >99%), nitroethane (Aldrich, >98%), 5-hydroxymethyl-2-pyrrolidinone (Chem-Impex International, 98.5%), propionitrile (Acros Organics, 99%), propionic acid (Alfa Aesar, 99%), methyl isovalerate (Aldrich, >98%), diethyl phosphite (Alfa Aesar, 96%), and tetrahydrofuran (Aldrich, >99%).

The following analytes were synthesized by literature procedures: (S)- and (R)-1-phenylethyl acetate ((S)- and (R)-4), 1-phenethyl amine (5), phenyl methyl sulfoxide (6), (S)- and (R)-Boc-BINOL ((S)- and (R)-8), (S)- and (R)-BINOL diacetate, 1-phenyl-1,2-ethanediol (14), 1-phenyl-2,2,2-trifluoroethanol (15), N-tosyl phenethyl amine (17), N-acetyl phenethyl amine (18), hydroxyphenylmethyl diethyl phosphonate (19), hydroxyphenylmethyl dimethyl phosphonate (20), 2-phenyl-2-butanol (28), 1-phenyl-1-chloroethane, and methyl 2-bromopropionate (29). Ibuprofen (13) was isolated from commercially available tablets following a literature procedure.

Alternative Syntheses of Λ-[Co((S,S)—NH$_2$CHPhCHPhNH$_2$)$_3$]$^{3+}$ 3I$^-$ (Λ-2$^{3+}$ 3I$^-$) Directly from Cobalt(II) Precursors (Bypassing Λ-2$^{3+}$ 3Cl$^-$ in FIG. 8) (A)

A gas circulating flask was charged with a solution of CoI$_2$ (0.156 g, 0.50 mmol) in CH$_3$OH (50 mL). Activated charcoal (0.05 g) and (S,S)-dpen (0.356 g, 1.68 mmol, 3.36 equiv) were added with vigorous stirring. Air was passed through the suspension. After 17 h, the mixture was filtered through Celite and aqueous HI (0.377 g, 57 wt %, 1.68 mmol) was added. The solvent was removed by rotary evaporation to give an orange solid. A portion was dissolved in acetone-d$_6$. $^{13}$C{$^1$H} NMR (acetone-d$_6$, δ in ppm, partial): 62.2 and 64.7 (2s, ca. 2:1, CHPh, Λ and Λ-2$^{3+}$ 3I$^-$). The solid was dissolved in 95:5 v/v CH$_2$Cl$_2$/CH$_3$OH (1 mL). The solution was loaded on a silica gel column (2×15 cm) packed in CH$_2$Cl$_2$, which was eluted with CH$_2$Cl$_2$/CH$_3$OH (100:0 v/v, 200 mL; 98:2 v/v, 500 mL; 97:3 v/v as needed). The orange band was collected. Solvents were removed by rotary evaporation. The residue was dried by oil pump vacuum at room temperature (20 h) to give Λ-2$^{3+}$ 3I$^-$.H$_2$O (0.208 g, 0.190 mmol, 38%) as an orange solid. (B) A solution of Co(OAc)$_2$.4H$_2$O (0.296 g, 1.19 mmol) in CH$_3$OH (50 mL), activated charcoal (0.1 g), (S,S)-dpen (0.849 g, 4.00 mmol, 3.36 equiv), air, Celite, and aqueous HI (0.898 g, 57 wt %, 4.00 mmol) were combined in a procedure analogous to that in A. A similar workup (3 mL 95:5 v/v CH$_2$Cl$_2$/CH$_3$OH) gave Λ-2$^{3+}$ 3I$^-$.H$_2$O (0.611 g, 0.559 mmol, 47%) as an orange solid, mp 200-201° C. dec (open capillary). Anal. Calcd. for C$_{42}$H$_{48}$CoI$_3$N$_6$H$_2$O (1094.05): C, 46.09, H, 4.60, N, 7.68; found C, 46.16, H, 4.75, N, 7.46.

NMR (acetone-d$_6$, δ in ppm): $^1$H (500 MHz) 7.57-7.54 (m, 12H, o-Ph), 7.53 (br s, 6H, NHH', partial overlap with o-Ph), 7.32-7.22 (m, 18H, m-, p-Ph), 5.63 (br s, 6H, NHH'), 5.25 (s, 6H, CHPh), 2.83 (br s, 7H, H$_2$O); $^{13}$C{$^1$H} (125 MHz) 130.3 (s, i-Ph), 130.0 (s, p-Ph), 129.6 and 128.8 (2 s, o- and m-Ph), 63.2 (s, CHPh).

Comparison of Ee Values Obtained by NMR and HPLC

Figure 9:
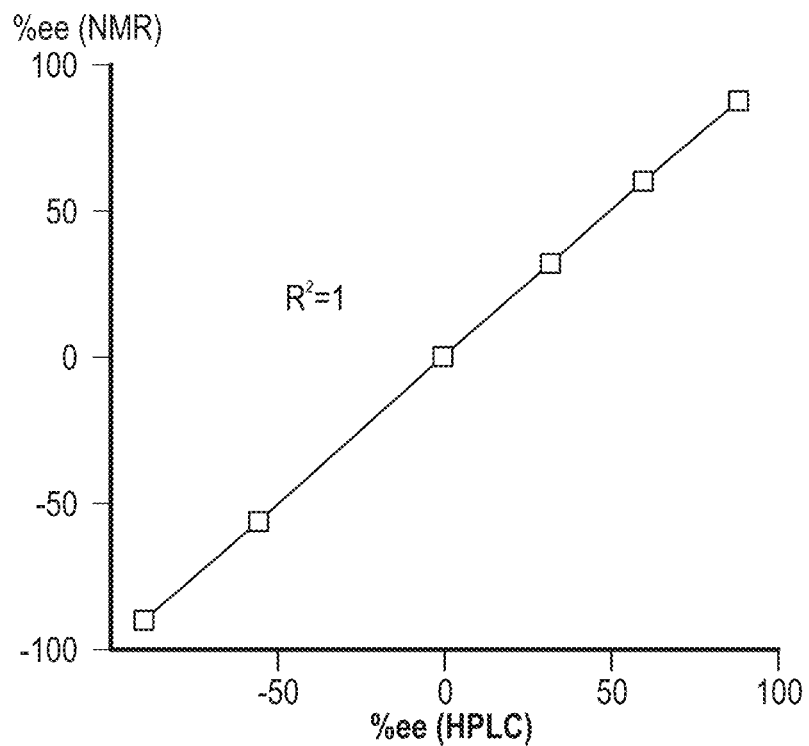
FIG. 9 illustrates a graphical comparison of ee values of scalemic 4 obtained by NMR and HPLC.

Standard solutions of (R)- and (S)-4 were prepared in hexanes/isopropanol (99:1 v/v, 0.0010 g/mL). These were mixed at different ratios into five separate volumetric flasks so that the total volume was always 1.00 mL (Table 2). Each was assayed by HPLC (Chiralcel OD-H column, hexane/isopropanol 99:1 v/v, 0.5 mL/min, 254 nm). The HPLC samples were concentrated by rotary evaporation, redissolved in CD$_2$Cl$_2$ (0.70 mL), and transferred to 5 mm NMR tubes. Then Λ-2$^{3+}$ 2Cl$^-$ BAr$_f^-$.2H$_2$O (0.0085 g, 0.0050 mmol) was added and $^1$H NMR spectra were recorded. Resulting data can be found in Table 2, shown below. FIG. 9 illustrates a graphical comparison of ee values of scalemic 4 obtained by NMR and HPLC, validating the methods of the present discloser versus prior methods involving HPLC. Table 2, shown below, illustrates a tabular comparison of ee values of scalemic 4 obtained by NMR and HPLC.

TABLE 2

| Sample | (R)-4 (mL)[a] | (S)-4 (mL)[a] | Theoretical ee (%) | HPLC ee (%) | NMR ee (%) |
|---|---|---|---|---|---|
| 1 | 0.940 | 0.060 | +88 | +88 | +88 |
| 2 | 0.800 | 0.200 | +60 | +60 | +60 |
| 3 | 0.660 | 0.340 | +32 | +32 | +32 |
| 4 | 0.220 | 0.780 | −56 | −56 | −56 |
| 5 | 0.050 | 0.950 | −90 | −90 | −90 |

[a]Per the experimental procedure, the volumes represent the ratios of the enantiomers in the samples assayed.

Results

Example Syntheses of Cobalt(III) CSAs

Enantiopure $\Lambda$-$1^{3+}$ 3BAr$_f^-$ and diastereopure $\Lambda$-$2^{3+}$ 2Cl$^-$BAr$_f^-$, $\Lambda$-$2^{3+}$ 2Cl$^-$B(C$_6$F$_5$)$_4^-$, $\Lambda$-$2^{3+}$ 3BAr$_f^-$, and $\Lambda$-$2^{3+}$ 2Cl$^-$BAr$_f^-$ were prepared according to known procedures. Those for the BAr$_f^-$ salts of $\Lambda$-$2^{3+}$ are summarized in FIG. 8. The precursor $\Lambda$-$2^{3+}$ 3Cl$^-$ is easily synthesized from CoCl$_2$ or Co(OAc)$_2$, O$_2$, and (S,S)-dpen.

The new triiodide salt $\Lambda$-$2^{3+}$ 3I$^-$ was isolated in 97% yield from the reaction of $\Lambda$-$2^{3+}$ 3Cl$^-$ and KI in acetone. Addition of 1.0 equiv of Na$^+$ BAr$_f^-$ afforded the mixed bis(iodide)/tetraarylborate salt $\Lambda$-$2^{3+}$ 2I$^-$BAr$_f^-$ in 99% yield after workup. This complex could also be isolated in >99% yield from the reaction of excess NaI and $\Lambda$-$2^{3+}$ 2Cl$^-$BAr$_f^-$. It possessed the advantage of being, unlike the other salts, soluble in the inexpensive deuterated solvent CDCl$_3$.

Screening of Cobalt(III) CSAs

The efficacies of the preceding complexes as CSAs were screened with racemic 1-phenylethyl acetate (4). As presented in Table 1, 0.0071 M solutions of the CSAs in various solvents were combined with neat 4 (1.0 equiv). In favorable cases, the chemical shifts of all of the aliphatic NMR signals of the enantiomers differed, as detailed in Table 3, shown below. In all of these cases, the methine (PhC$\underline{H}$(CH$_3$)O(C=O)CH$_3$) protons were the most strongly differentiated ($\Delta\delta$, Table 1). However, $\Lambda$-$1^{3+}$ 3BAr$_f^-$ (entry 1) was ineffective in all assays, including additional analytes such as 1-phenethyl amine (5), phenyl methyl sulfoxide (6), and 2-carbomethoxycyclopentanone (7).

Table 3, shown below, illustrates an expansion of Table 1 showing the separation of all aliphatic $^1$H NMR signals ($\Delta\delta$, ppm) of the enantiomers of racemic 1-phenylethyl acetate (4).

In contrast, the bis(chloride) tetraarylborate salts $\Lambda$-$2^{3+}$ 2Cl$^-$BAr$_f^-$ and $\Lambda$-$2^{3+}$ 2Cl$^-$B(C$_6$F$_5$)$_4^-$ gave widely separated methine proton signals in CD$_2$Cl$_2$ (entries 2 and 4; $\Delta\delta$ 1.37-1.32 ppm). The opposite diastereomer of the former, $\Lambda$-$2^{3+}$ 2Cl$^-$BAr$_f^-$, was much less effective (entry 3, $\Delta\delta$ 0.15 ppm). Interestingly, the corresponding tris(tetraarylborate) salt $\Lambda$-$2^{3+}$ 3BAr$_f^-$ was also less effective (entry 5; $\Delta\delta$ 0.34 ppm), despite the removal of all counter anions that can hydrogen bond to the NH groups of the cation.

The bis(iodide) salt $\Lambda$-$2^{3+}$ 2I$^-$BAr$_f^-$ gave a high $\Delta\delta$ value (entry 6; 1.30 ppm), comparable to that of $\Lambda$-$2^{3+}$ 2Cl$^-$BAr$_f^-$. When $\Lambda$-$2^{3+}$ 2I$^-$BAr$_f^-$ was applied in the less polar and coordinating solvent CDCl$_3$, the $\Delta\delta$ value increased by 33% (entry 7, 1.75 ppm). Finally, when either $\Lambda$-$2^{3+}$ 2Cl$^-$BAr$_f^-$ or $\Lambda$-$2^{3+}$ 2I$^-$BAr$_f^-$ were employed in the more polar and coordinating solvents acetone-d$_6$, CD$_3$CN, or DMSO-d$_6$, the enantiomers of 4 were no longer differentiated (entries 8-13).

The present disclosure sought to establish the minimum CSA loading needed to resolve the NMR signals of the enantiomers. Accordingly, an NMR tube was charged with a 0.036 M CD$_2$Cl$_2$ solution of $\Lambda$-$2^{3+}$ 2Cl$^-$BAr$_f^-$ (0.70 mL, 0.025 mmol). Then neat 4 was added in increments (0.00050 mL; ca. 0.0012 g, 0.0050 mmol). As shown in FIG. 2, the M values for all three aliphatic signals were plotted against the mol % of the CSA, which is in great excess at the start. The data spanned a range of 500 mol % down to 5 mol % (total volume of liquids: 0.7005 to 0.7500 mL, or less than a 7% concentration change). Although the $\Delta\delta$ values monotonically decreased, all signals maintained baseline separations.

The concentration dependence of the efficacies of the CSAs was also probed. For this purpose, a NMR tube was charged with a CD$_2$Cl$_2$ solution that was 0.040 M in 4 (0.020 mmol) and 0.010 M in $\Lambda$-$2^{3+}$ 2Cl$^-$BAr$_f^-$ (0.0050 mmol), or a CSA loading of 25 mol %. Then increments of CD$_2$Cl$_2$ were added, giving more dilute solutions. As shown in FIG. 3, there was little change in the $\Delta\delta$ values over a twofold dilution. However, up to a 30% decrease could be seen at the lower concentration ranges investigated.

Functional Group Scope, Chirality Sensing

As summarized in FIG. 4, racemic chiral organic compounds with a variety of Lewis basic functionalities (4-31) were treated with the most effective CSAs, $\Lambda$-$2^{3+}$ 2I$^-$BAr$_f^-$ (CDCl$_3$ solution) and $\Lambda$-$2^{3+}$ 2Cl$^-$BAr$_f^-$ (CD$_2$Cl$_2$ solution). The former could differentiate the $^1$H NMR signals of the enantiomers in every case, and the latter failed with only three analytes. With fluorine (15) or phosphorus (19, 20) containing analytes, $^{19}$F{$^1$H} or $^{31}$P{$^1$H} NMR was used

TABLE 3

| Entry | CSA | Solvent | $\Delta\delta$ (ppm) PhCH(CH$_3$)O | $\Delta\delta$ (ppm) O(C=O)CH$_3$ | $\Delta\delta$ (ppm) PhCH(CH$_3$)O |
|---|---|---|---|---|---|
| 1 | $\Lambda$-$1^{3+}$ 3BAr$_f^-$ | CD$_2$Cl$_2$ | — | — | — |
| 2 | $\Lambda$-$2^{3+}$ 2Cl$^-$BAr$_f^-$ | CD$_2$Cl$_2$ | 1.32 | 0.50 | 0.28 |
| 3 | $\Lambda$-$2^{3+}$ 2Cl$^-$BAr$_f^-$ | CD$_2$Cl$_2$ | 0.15 | 0.02 | — |
| 4 | $\Lambda$-$2^{3+}$ 2Cl$^-$(C$_6$F$_5$)$_4^-$ | CD$_2$Cl$_2$ | 1.37 | 0.53 | 0.28 |
| 5 | $\Lambda$-$2^{3+}$ 3BAr$_f^-$ | CD$_2$Cl$_2$ | 0.34 | 0.15 | 0.08 |
| 6 | $\Lambda$-$2^{3+}$ 2I$^-$BArf$^-$ | CD$_2$Cl$_2$ | 1.30 | 0.52 | 0.25 |
| 7 | $\Lambda$-$2^{3+}$ 2I$^-$BArf$^-$ | CDCl$_3$ | 1.75 | 0.68 | 0.37 |
| 8 | $\Lambda$-$2^{3+}$ 2I$^-$BArf$^-$ | acetone-d$_6$ | — | — | — |
| 9 | $\Lambda$-$2^{3+}$ 2I$^-$BArf$^-$ | CD$_3$CN | — | — | — |
| 10 | $\Lambda$-$2^{3+}$ 2I$^-$BArf$^-$ | DMSO-d$_6$ | — | — | — |
| 11 | $\Lambda$-$2^{3+}$ 2Cl$^-$BAr$_f^-$ | acetone-d$_6$ | — | — | — |
| 12 | $\Lambda$-$2^{3+}$ 2Cl$^-$BAr$_f^-$ | CD$_3$CN | — | — | — |
| 13 | $\Lambda$-$2^{3+}$ 2Cl$^-$BAr$_f^-$ | DMSO-d$_6$ | — | — | — | instead. In cases where signals have been assigned to specific enantiomers, the samples were spiked with 0.50 equiv of an authentic sample of one of the enantiomers.

With $\Lambda\text{-}2^{3+}$ $2\text{Cl}^-\text{BAr}_f^-$, the loadings required for baseline to near-baseline signal separations ranged from 1 to 100 mol %, with an average of 34 mol %. With $\Lambda\text{-}2^{3+}$ $2\text{I}^-\text{BAr}_f^-$, the loading range was identical, but the average decreased to 14 mol %. The present disclosure sought to verify that reliable quantitative data could be obtained from this new class of CSAs. Thus, scalemic samples of 4 were prepared and the ee values assayed using both $\Lambda\text{-}2^{3+}$ $2\text{Cl}^-\text{BAr}_f^-$ and chiral HPLC, as described in herein above. As depicted in FIG. 9, the two methods were essentially in perfect agreement.

When a chiral arene lacking a Lewis basic functional group, sec-butyl benzene ($\text{PhCH}(\text{CH}_3)\text{CH}_2\text{CH}_3$), was similarly investigated ($\Lambda\text{-}2^{3+}$ $2\text{I}^-\text{BAr}_f^-$, $\text{CDCl}_3$), only a single set of (broadened) NMR signals was observed. Other analytes that gave only one set of signals included the benzylic chloride 1-phenyl-1-chloroethane, BINOL and its diacetate, and, surprisingly, the amide 5-hydroxymethyl-2-pyrrolidinone. However, the enantiomers of alkyl halides that contained additional Lewis basic functional groups, such as 29 and 30 (FIG. 4), were easily differentiated.

Prochirality Sensing

The types of experiments disclosed in the preceding were repeated with achiral molecules using a CSA loading of 100 mol % (1.0 equiv). As summarized in FIG. 6, in many cases different signals were observed for enantiotopic groups. Enantiotopic geminal or vicinal hydrogen atoms also became coupled to each other. Achiral molecules in which enantiotopic groups were not differentiated include nitroethane, propionitrile, propionic acid, methyl isovalerate, tetrahydrofuran, and diethyl phosphite.

Enhanced Throughput Sensing

Higher throughput variants of the above methodology would be desirable. Thus, it was tested whether the enantiomeric purities of two or more analytes could be simultaneously determined. A $\text{CDCl}_3$ solution of racemic 4, 2-carbomethoxycyclopentanone (7), 1-phenylethanol (10), and two hydroxyphenylmethyl dialkyl phosphonates (19, 20) was prepared (2.0:2.0:2.0:1.0:2.0 mol ratio). Then $\Lambda\text{-}2^{3+}$ $2\text{I}^-\text{BAr}_f^-$ was added (100 mol % with respect to 19; 50 mol % with respect to the other analytes; average loading per analyte 11 mol %). As shown in FIG. 5A and FIG. 5B, the enantiomers of all five analytes were differentiated by NMR.

Such experiments are potentially complicated by overlapping signals, but this is sidestepped in FIG. 5A and FIG. 5B by using a second nucleus, $^{31}\text{P}$, to assay the phosphonates 19 and 20. Advantageously, various uses of simultaneous enantiomeric purity assays would include kinetic resolutions, for example the acetylation of 10 to 4 or vice-versa, and enantioselective reactions that afford two or more diastereomers. Currently, the closest approximation to this capability seems to involve covalent adducts of CDAs where all analytes contain a common functional group (e.g., a primary amine).

Mechanism of Chirality and Prochirality Sensing

Some insight has been acquired regarding hydrogen bonding between the twelve NH protons of the cations $1^{3+}$ and $2^{3+}$ and various counter anions. For example, data for $\Lambda\text{-}2^{3+}$ $2\text{Cl}^-\text{BAr}_f^-$ indicate that the two chloride anions strongly bind to the two $C_3$ faces, shifting the $^1\text{H}$ NMR signals of six NH protons markedly downfield (ca. $\delta$ 8 ppm). The other six NH protons, which occupy the three $C_2$ faces, have only the solvent or the very poorly coordinating $\text{BAr}_f^-$ anion to interact with. Accordingly, their $^1\text{H}$ NMR signals remain upfield (ca. $\delta$ 4 ppm). These trends are illustrated in the bottom spectrum in FIG. 7, although it deserves emphasis that the signal separation is both concentration and temperature dependent.

As exemplified by the other spectra in FIG. 7, $\text{CD}_2\text{Cl}_2$ solutions of $\Lambda\text{-}2^{3+}$ $2\text{Cl}^-\text{BAr}_f^-$ have been titrated with various analytes, such as dimethyl malonate, trans-$\beta$-nitrostyrene, methyl ethyl ketone, and both enantiomers of 4. In proceeding from one to 10 equivalents, appreciable downfield shifts of the upfield $C_2$ NH signals are observed. The downfield $C_3$ NH signals are much less affected. Often there is virtually no shift, as seen with dimethyl malonate (FIG. 7, $\Delta\delta$=0.07 ppm), trans-$\beta$-nitrostyrene, and methyl ethyl ketone; with the enantiomers of 4, there is a modest upfield trend (0.13-0.33 ppm). Although these shifts may reflect a combination of phenomena, it seems that the donor functionalities in the analytes hydrogen bond to the $C_2$ faces.

The data of the present disclosure documents an impressive efficacy of $\Lambda\text{-}2^{3+}$ $2\text{Cl}^-\text{BAr}_f^-$ and $\Lambda\text{-}2^{3+}$ $2\text{I}^-\text{BAr}_f^-$ as CSAs. The former has the advantage of being commercially available, whereas the latter (easily synthesized from the former) exhibits superior performance characteristics apparently connected to its solubility in $\text{CDCl}_3$. The data for $\Lambda\text{-}2^{3+}$ $2\text{Cl}^-\text{B}(\text{C}_6\text{F}_5)_4^-$ in Table 1 suggest that salts with related tetraarylborate anions may be comparably effective. The mechanism of action involves hydrogen bonding between the $C_2$ NH donor groups of the CSAs and the analytes.

Most of the other CSAs described in literature also feature hydrogen bond donor groups, although many possess acceptor groups as well. Typical donor groups include ureas or chalcogenoureas, squaramides, secondary amines, amides of primary amines, sulfonamides, and BINOL derivatives. However, many of these have only been applied to one or two functional groups.

In a previous report of a broadly applicable CSA, the lead system, 48 (FIG. 10), was applied to ten functional groups, three of which were not assayed with $\Lambda\text{-}2^{3+}$ $2\text{X}^-\text{BAr}_f^-$ (oxazolidinone, sulfoximine, isocyanate). The typical loadings were 100-200 mol %, although a chiral sulfoxide was found to require only 5 mol %. Conversely, FIG. 4 and FIG. 6 contain several functional groups that have not been studied (ester/$\beta$-ketoester, amine, amide/sulfonamide, hydroxyphosphonate, ketone/1,3-diketone, ether). Furthermore, with the lead CSA of the present disclosure, $\Lambda\text{-}2^{3+}$ $2\text{I}^-\text{BAr}_f^-$, the average loading is 14% (range 1-100%).

There is a wider selection of CSAs that have been applied to four-seven functional groups. These generally require loadings of 100-300 mol %, although with one analyte, the CSA 49 (FIG. 7) was shown to be effective at 60 mol %. None of these CSAs are commercially available. However, a library of 32 commercial CSAs has been assembled and high throughput protocols have been developed for identifying optimal partners for specific analytes. Though, far fewer CSAs have been applied to prochirality sensing, and the eight functional groups represented in FIG. 6 exceed the sum of all those.

Figure 10:
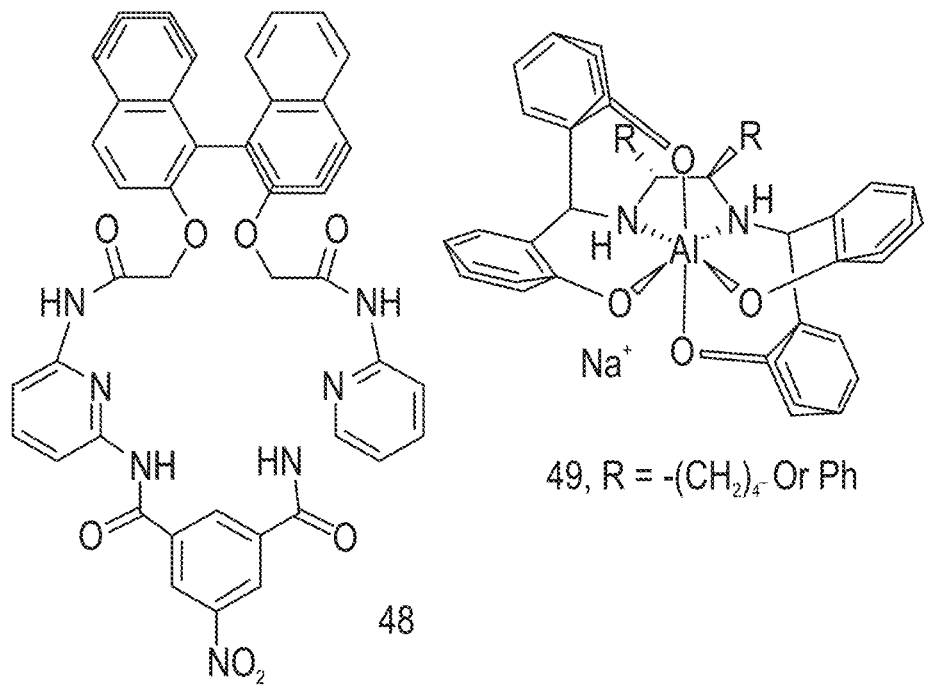
FIG. 10 illustrates relevant currently available CSAs.

In the present disclosure it is shown that the above salts of $\Lambda\text{-}2^{3+}$ represent the first CSAs that are based upon transition metals. However, transition metals are well represented among chiral derivatizing agents (CDAs). The salt 49 in FIG. 10 is based upon a main group metal, aluminum, and displays several conceptual similarities with cobalt(III) systems. First, both metals are octahedral and constitute stereocenters, second, the anion of 49 as $C_2$ symmetry, versus $D_3$ symmetry for the cation $2^{3+}$, and third, 49 has two Al—NH groups that can serve as hydrogen bond donors, as well as four Al—O groups that can serve as hydrogen bond acceptors.

Figure 8:
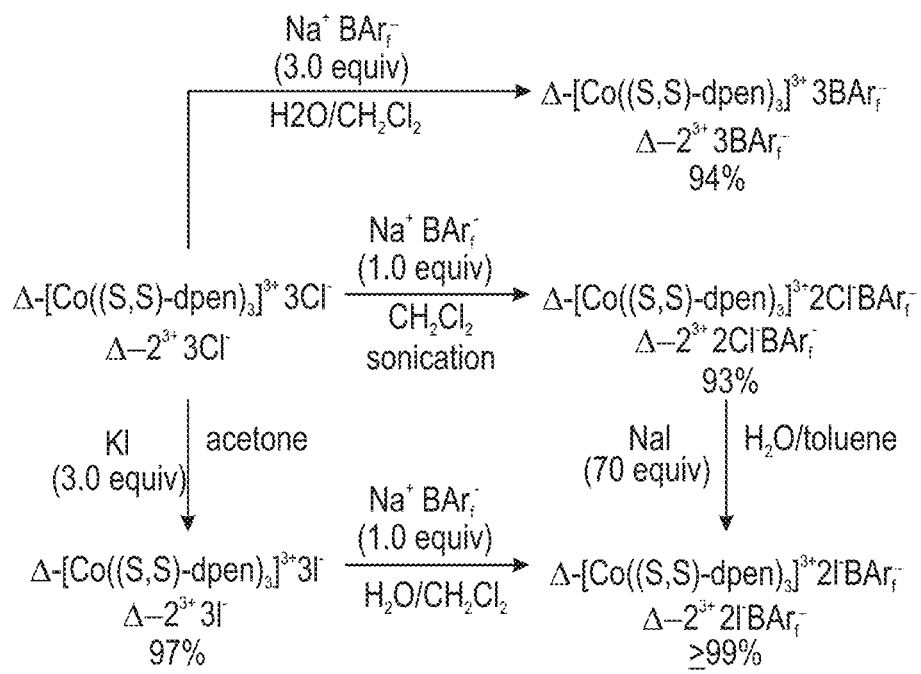
FIG. 8 illustrates representative syntheses of cobalt(III) CSAs (all reactions at room temperature, 5 min to 6 h).

There is a variety of evidence that the enthalpy of hydrogen bonding to a $C_3$ face of $\Lambda$-$2^{3+}$ is much greater than that to a $C_2$ face. For example, the solid state structures of the diastereomeric trichloride salts $\Lambda$- and $\Delta$-$2^{3+}$ $3Cl^-$ show the three chloride ions to be distributed over two $C_3$ faces and one $C_2$ face (as opposed to, for example, three $C_2$ faces). FIG. 8 shows that one chloride ion, presumably that associated with the $C_2$ face, can more easily be replaced by the very poor hydrogen bond acceptor $BAr_f^-$ than the other two. As illustrated by the bottom trace in FIG. 7, the $^1H$ NMR spectra of mixed salts $\Lambda$-$2^{3+}$ $2X^-BAr_f^-$ always show two NH signals of equal area (6H/6H), with the downfield signal moving upfield as $X^-$ becomes a poorer hydrogen bond acceptor (e.g., $BF_4^-$, $PF_6^-$). These observations are consistent with two "occupied" $C_3$ faces and three "free" $C_2$ faces.

When $\Lambda$-$2^{3+}$ $2Cl^-BAr_f^-$ is titrated with suitable substrates, such as dimethyl malonate in FIG. 7, the upfield NH groups shift markedly downfield, but the downfield NH groups are much less affected. This indicates dominant analyte binding at the $C_2$ faces.

The loss of efficacy of $\Lambda$-$2^{3+}$ $2Cl^-BAr_f^-$ and $\Lambda$-$2^{3+}$ $2I^-BAr_f^-$ in coordinating solvents (entries 8-13, Table 1) presumably reflects the saturation of the $C_2$ faces, obstructing access by the analytes. The halide free salt $\Lambda$-$2^{3+}$ $3BAr_f^-$, with three very poorly hydrogen bond accepting anions, give much lower $\Delta\delta$ values (entry 5, Table 1). While not being bound by theory, it is speculated that the analyte now preferentially binds to an "unoccupied" $C_3$ face, which for some reason gives diminished chiral recognition.

The new cobalt based CSAs described herein offer unparalleled functional group applicability, effectiveness at significantly lower loadings and in the presence of multiple analytes, extended stability to air and water, and ready availability from inexpensive building blocks. Their success reflects the generality of second coordination sphere hydrogen bonding between the NH donor groups and Lewis basic functional groups in the analytes. Given the many "best in class" characteristics, and recent commercial availability, they appear primed for wide adoption.

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially", "approximately", "generally", and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a", "an", and other singular terms are intended to include the plural forms thereof unless specifically excluded.

What is claimed is:

1. A composition comprising:
   a chiral solvating agent to resolve nuclear magnetic resonance signals of an enantiomer of at least one analyte, wherein the chiral solvating agent facilitates in the at least one analyte binding to a $C_2$ face or a $C_3$ face of the chiral solvating agent;
   wherein the chiral solvating agent causes an upfield shift or a downfield shift in at least one nuclear magnetic resonance signal corresponding to a $^1H$, $^{19}F\{^1H\}$, or $^{31}P\{^1H\}$ signal;
   wherein the chiral solvating agent comprises a cobalt cation;
   wherein the cobalt cation is selected from the group consisting of $[Co((S,S)-NH_2CHPhCHPhNH_2)_3]^{3+}$, $[Co((R,R)-NH_2CHPhCHPhNH_2)_3]^{3+}$, $[Co((S,S)-NH_2CHArCHArNH_2)_3]^{3+}$, $[Co((R,R)-NH_2CHArCHArNH_2)_3]^{3+}$, or combinations thereof; and
   wherein Ar is a substituted or unsubstituted aryl group selected from the group consisting of a phenyl group, a naphthyl group, a furanyl group, or combinations thereof.

2. The composition of claim 1, wherein the cobalt cation is in the form of a salt comprising at least one lipophilic anion, lipophilic dianion, or lipophilic trianion.

3. The composition of claim 1, wherein the chiral solvating agent has a loading of between less than 1 mol % to 100 mol %.

4. The composition of claim 1, wherein the at least one analyte comprises a plurality of enantiomeric compounds.

5. A method comprising:
   mixing a chiral solvating agent, comprising a cobalt cation, with at least one analyte to form a solution;
   obtaining nuclear magnetic resonance spectra of the solution; and
   identifying an enantiomer of the at least one analyte;
   wherein the cobalt cation is selected from the group consisting of $[Co((S,S)-NH_3CHPhCHPhNH_2)_3]^{3+}$, $[Co((R,R)-NH_2CHPhCHPhNH_2)_3]^{3+}$, $[Co((S,S)-NH_2CHArCHArNH_2)_3]^{3+}$, $[Co((R,R)-NH_2CHArCHArNH_2)_3]^{3+}$, or combinations thereof; and
   wherein Ar is a substituted or unsubstituted aryl group selected from the group consisting of a phenyl group, a naphthyl group, a furanyl group, or combinations thereof.

6. The method of claim 5, further comprising determining enantiomeric purities of the at least one analyte.

7. The method of claim 5, wherein the cobalt cation is in the form of a salt comprising at least one lipophilic anion, lipophilic dianion, or lipophilic trianion.

8. The method of claim 5, wherein the chiral solvating agent has a loading between less than 1 mol % to 100 mol %.

9. The method of claim 5, wherein the at least one analyte comprises a plurality of enantiomeric compounds.

10. The method of claim 5, wherein the at least one analyte binds to a $C_2$ face or a $C_3$ face of the chiral solvating agent.

11. A composition comprising:
    a chiral solvating agent to resolve nuclear magnetic resonance signals of an enantiomer of at least one analyte, wherein the chiral solvating agent facilitates in the at least one analyte binding to a $C_2$ face or a $C_3$ face of the chiral solvating agent;

wherein the chiral solvating agent causes an upfield shift or a downfield shift in at least one nuclear magnetic resonance signal corresponding to a $^1H$, $^{19}F\{^1H\}$, or $^{31}P\{^1H\}$ signal;

wherein the chiral solvating agent comprises a cobalt cation;

wherein the cobalt cation is selected from the group consisting of $[Co(en)_2(NH_2-CH_2CH((CH_2)_nN(CH_3)_2)NH_2)]^{3+}$, $[Co(en)_2(NH_2CH_2CH((CH_2)_nN(R)(R'))NH_2)]^{3+}$, or combinations thereof; and wherein R and R' are each selected from the group consisting of H, Ph, Bn, an alkyl group, an aryl group, $Si(R^1)_2(R^2)$, $C(R^1)_2(R^2)$, or combinations thereof; and wherein $R^1$ and $R^2$ are each selected from the group consisting of H, Ph, Bn, an alkyl group, an aryl group, or combinations thereof.

12. A method comprising:

mixing a chiral solvating agent, comprising a cobalt cation, with at least one analyte to form a solution;

obtaining nuclear magnetic resonance spectra of the solution; and identifying an enantiomer of the at least one analyte;

wherein the cobalt cation is selected from the group consisting of $[Co(en)_2(NH_2-CH_2CH((CH_2)_nN(CH_3)_2)NH_2)]^{3+}$, $[Co(en)_2(NH_2CH_2CH((CH_2)_nN(R)(R'))NH_2)]^{3+}$, or combinations thereof; and wherein R and R' are each selected from the group consisting of H, Ph, Bn, an alkyl group, an aryl group, $Si(R^1)_2(R^2)$, $C(R^1)_2(R^2)$, or combinations thereof; and wherein $R^1$ and $R^2$ are each selected from the group consisting of H, Ph, Bn, an alkyl group, an aryl group, or combinations thereof.

* * * * *